(12) United States Patent
Eronen et al.

(10) Patent No.: US 10,887,719 B2
(45) Date of Patent: Jan. 5, 2021

(54) APPARATUS AND ASSOCIATED METHODS FOR PRESENTATION OF SPATIAL AUDIO

(71) Applicant: Nokia Technologies Oy, Espoo (FI)

(72) Inventors: Antti Eronen, Tampere (FI); Arto Lehtiniemi, Lempäälä (FI); Sujeet Shyamsundar Mate, Tampere (FI); Jussi Leppänen, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/605,310

(22) PCT Filed: Apr. 27, 2018

(86) PCT No.: PCT/FI2018/050309
§ 371 (c)(1),
(2) Date: Oct. 15, 2019

(87) PCT Pub. No.: WO2018/202947
PCT Pub. Date: Nov. 8, 2018

(65) Prior Publication Data
US 2020/0128348 A1 Apr. 23, 2020

(30) Foreign Application Priority Data
May 2, 2017 (EP) .................................... 17168958

(51) Int. Cl.
*H04S 7/00* (2006.01)
*G06F 3/01* (2006.01)
(Continued)

(52) U.S. Cl.
CPC .............. *H04S 7/303* (2013.01); *G06F 3/011* (2013.01); *H04R 1/406* (2013.01); *H04R 3/005* (2013.01);
(Continued)

(58) Field of Classification Search
CPC . H04S 7/30; H04S 7/302; H04S 7/303; H04S 7/304; H04S 7/008; H04S 2400/01;
(Continued)

(56) References Cited

U.S. PATENT DOCUMENTS 6,961,439 B2 11/2005 Ballas
9,430,038 B2 8/2016 Ebstyne et al.
(Continued)

FOREIGN PATENT DOCUMENTS

EP 2842529 A1 3/2015

OTHER PUBLICATIONS

"Tango (Platform)", Wikipedia, Retrieved on Oct. 9, 2019, Webpage available at : https://en.wikipedia.org/wiki/Tango_(platform).
(Continued)

*Primary Examiner* — Thang V Tran
(74) *Attorney, Agent, or Firm* — Alston & Bird LLP (57) ABSTRACT

In respect of spatial audio configured to be associated with a moveable, particular object in a scene, the spatial audio for presentation such as to be perceived as originating from a particular direction, the location of the object determined based on automatic identification in sensor data to enable positioning of the spatial audio to correspond to the location of the object, the sensor data from a sensor having a limited field of view of the real-world scene at any one time; based on a current location of the object being unknown; provide for audible presentation of the spatial audio with a previously-determined-direction and, based on a current field of view of the user moving to the previously-determined-direction, provide for modification of the spatial audio from the previously-determined-direction to a direction outside the current field of view of the user at least until the object is once again identified.

20 Claims, 5 Drawing Sheets

(51) Int. Cl.
  *H04R 1/40* (2006.01)
  *H04R 3/00* (2006.01)
  *H04R 5/027* (2006.01)
  *H04S 3/00* (2006.01)
(52) U.S. Cl.
  CPC ............. *H04R 5/027* (2013.01); *H04S 3/008* (2013.01); *H04S 2400/01* (2013.01); *H04S 2400/11* (2013.01); *H04S 2400/15* (2013.01); *H04S 2420/01* (2013.01)
(58) Field of Classification Search
  CPC ............. H04S 2400/11; H04S 2400/15; H04S 2420/01; G06F 3/01; G06F 3/011; G06F 3/012; G06F 3/013; G06F 3/165; H04R 3/00; H04R 3/005; H04R 1/406; H04R 5/00; H04R 5/027
  See application file for complete search history.

(56) References Cited

U.S. PATENT DOCUMENTS

| | | | |
|---|---|---|---|
| 2011/0140994 A1* | 6/2011 | Noma ................. | G02B 27/017 345/8 |
| 2012/0268563 A1* | 10/2012 | Chou ................. | H04N 13/271 348/46 |
| 2013/0041648 A1 | 2/2013 | Osman | |
| 2014/0347390 A1 | 11/2014 | Poulos et al. | |
| 2015/0025662 A1 | 1/2015 | Di Censo et al. | |
| 2015/0063610 A1* | 3/2015 | Mossner ................. | H04S 5/005 381/307 |
| 2016/0025981 A1* | 1/2016 | Burns ................. | G02B 27/0101 345/156 |
| 2016/0279660 A1* | 9/2016 | Tanaka ................. | B05C 5/0216 |
| 2018/0007262 A1* | 1/2018 | Rantala ................. | G06F 3/013 |
| 2018/0095542 A1* | 4/2018 | Mallinson ................. | G06F 3/017 |
| 2018/0349088 A1* | 12/2018 | Leppanen ............. | G06F 3/04815 |
| 2019/0298419 A1* | 10/2019 | Biedermann ...... | A61B 17/7037 |

OTHER PUBLICATIONS

Extended European Search Report received for corresponding European Patent Application No. 17168958.1, dated Oct. 17, 2017, 9 pages.

International Search Report and Written Opinion received for corresponding Patent Cooperation Treaty Application No. PCT/FI2018/050309, dated Jul. 24, 2018, 13 pages.

Office Action for European Application No. 17168958.1 dated Sep. 3, 2020, 18 pages.

* cited by examiner

1000 — based on a current location of the particular real-world object being unknown by virtue of the particular real-world object not being currently identifiable in the sensor data 1001 — providing for audible presentation to a user of the spatial audio with its particular direction comprising a last-known-direction comprising the last known location at which the real-world object was identified in the real-world scene and, based on a current field of view of the user moving to a position that includes said last known location, providing for modification of the particular direction of the spatial audio from the last-known-direction to a direction outside the current field of view of the user at least until the particular real-world object is automatically identified in the sensor data

Figure 11

APPARATUS AND ASSOCIATED METHODS FOR PRESENTATION OF SPATIAL AUDIO

CROSS-REFERENCE TO RELATED APPLICATION

This application was originally filed as Patent Cooperation Treaty Application No. PCT/FI2018/050309 filed Apr. 27, 2018, and further claims priority benefit to EP Patent Application No. 17168958.1, filed May 2, 2017.

TECHNICAL FIELD

The present disclosure relates to the field of spatial audio and, in particular, to the presentation of spatial audio when the location of objects in a scene is not always known. It also relates to associated methods, computer programs and apparatus.

BACKGROUND

The augmentation of real-world objects with graphics and audio is becoming common, with augmented/virtual reality content creators providing more and more content for augmentation of the real-world. The hardware requirement for end-users to experience augmented reality may increase as content creators become more creative or the experience is expected to be more realistic. However, ensuring that content can be presented professionally despite hardware limitations is important.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
 at least one processor; and
 at least one memory including computer program code,
 the at least one memory and the computer program code configured to, with the at least one processor, cause the apparatus to perform at least the following:
 in respect of spatial audio configured to be associated with a moveable, particular real-world object in a real-world scene, the spatial audio comprising audio that is for audible presentation such as to be perceived as originating from a particular direction in the real-world scene, a location of the particular real-world object determined based on identification of the particular real-world object in sensor data of the real-world scene to enable positioning of the particular direction of the spatial audio to correspond to the location of the particular real-world object in the real-world scene, the sensor data obtained from at least one sensor having a sensor field of view that covers a limited region of the real-world scene at any one time;
 based on a current location of the particular real-world object being unknown by virtue of the particular real-world object not being identifiable in the sensor data; provide for audible presentation to a user of the spatial audio such that it is perceived as originating from a particular direction comprising a previously-determined-direction comprising a direction towards a previously determined location at which the real-world object was identified in the real-world scene and, based on one or both of a current field of view of the user and a current field of view of the sensor moving to a position that includes said previously determined location, provide for modification of the particular direction of the spatial audio from the previously-determined-direction to a direction outside the current field of view of the user at least until the particular real-world object is identified in the sensor data.

In one or more examples the spatial audio may form part of augmented reality content. In one or more examples, the location of the real-world object is reported to the apparatus based on automatic identification of the object and subsequent determination of its location.

In one or more embodiments, after the modification of the particular direction and based on identification of the real-world object in the sensor data and determination of a current location of the real-world object, the apparatus is caused to provide for further modification of the particular direction of the spatial audio to correspond to the determined current location of the real-world object.

In one or more embodiments, after the modification of the particular direction and based on the current location of the real-world object being unknown for a predetermined period of time by virtue of the real-world object not being identified in the sensor data for a predetermined period of time, the apparatus is caused to provide for at least one of:
 i) presentation of the spatial audio without a particular direction such that the source of the spatial audio is perceived as ambient audio;
 ii) ceasing the presentation of the spatial audio.

In one or more embodiments, the limited region of the real-world scene captured by the sensor in the sensor data is based on the current field of view of the user such that there is at least a partial overlap between the sensor's current field of view and the user's current field of view.

In one or more examples, the limited region of the real-world scene captured by the sensor in the sensor data is wider than and aligned with the current field of view of the user such that the user's current field of view is within the sensor's current field of view.

In one or more embodiments, based on the real-world object not being identifiable in the real-world scene determined by virtue of a determination that at least a predetermined amount of the real-world scene has been covered in the sensor data within a recent predetermined time period and the real-world object has not been identified in said recent predetermined time period, provide for at least one of:
 i) presentation of the spatial audio without a particular direction such that the spatial audio is perceived as ambient audio;
 ii) termination of the presentation of the spatial audio.

In one or more embodiments, based on the real-world object having returned to the real-world scene determined at least by virtue of the automatic identification of the particular real-world object in the sensor data of the real-world scene, provide for presentation of the spatial audio with a particular direction corresponding to a direction towards the returned real-world object from a point of view of the user.

In one or more embodiments, the modification of the particular direction of the spatial audio from the previously-determined-direction to the direction outside the current field of view of the user comprises modification of the particular direction to a direction within a threshold angle of an edge of the field of view of the user, such that the spatial audio is perceived by the user as originating from a direction just out of view of the user.

In one or more embodiments, the apparatus comprises one of:
- an augmented reality device having speakers for presentation of the spatial audio, the augmented reality device configured to allow the user a view of the real-world scene before them;
- a virtual reality device configured to provide a virtual reality view, captured by a camera, of the real-world scene to the user, the virtual reality view defining the current field of view of the user and the virtual reality device having speakers for presentation of the spatial audio; and
- an apparatus in communication with said augmented reality device or said virtual reality device.

In one or more embodiments, the spatial audio is presented using one of head-related-transfer-function filtering and vector-base-amplitude panning to position the perceived aural origin of the spatial audio at the particular direction.

In one or more embodiments, the sensor comprises at least one of:
- a camera and the sensor data comprises camera imagery of the real-world scene, the sensor field of view comprising the field of view of the camera, and the identification of the particular real-world object comprises automatic visual identification of the particular real-world object in the camera imagery by a real-world object identification module in communication with the apparatus;
- an audio sensor array and the sensor data comprises an audio map of the real-world scene comprising the directions from which audio is received from the real-world scene, the sensor field of view comprising the field of view of the audio sensor array in terms of the area over which the audio sensor array may detect audio from the real-world scene, and the automatic identification of the particular real-world object comprises automatic audio identification of the particular real-world object in the audio map by a real-world object identification module in communication with the apparatus.

In one or more embodiments, the spatial audio is associated with identification data, the identification data defining the real-world object with which the spatial audio should be associated.

In a second aspect there is provided a method, the method comprising:
- in respect of spatial audio configured to be associated with a moveable, particular real-world object in a real-world scene, the spatial audio comprising audio that is for audible presentation such as to be perceived as originating from a particular direction in the real-world scene, a location of the particular real-world object determined based on identification of the particular real-world object in sensor data of the real-world scene to enable positioning of the particular direction of the spatial audio to correspond to the location of the particular real-world object in the scene, the sensor data obtained from at least one sensor having a sensor field of view that covers a limited region of the real-world scene at any one time;
- based on a current location of the particular real-world object being unknown by virtue of the particular real-world object not being identifiable in the sensor data;
- providing for audible presentation to a user of the spatial audio such that it is perceived as originating from a particular direction comprising a previously-determined-direction comprising a direction towards a previously determined location at which the real-world object was identified in the real-world scene and, based on one or both of a current field of view of the user and a current field of view of the sensor moving to a position that includes said previously determined location, providing for modification of the particular direction of the spatial audio from the previously-determined-direction to a direction outside the current field of view of the user at least until the particular real-world object is identified in the sensor data.

In one or more embodiments, after the modification of the particular direction and based on identification of the real-world object in the sensor data and determination of a current location of the real-world object, providing for further modification of the particular direction of the spatial audio to correspond to the determined current location of the real-world object.

In one or more embodiments, after the modification of the particular direction and based on identification of the real-world object in the sensor data and determination of a current location of the real-world object, the apparatus is caused to provide for presentation of the spatial audio without a particular direction such that the spatial audio is perceived as ambient audio.

In a third aspect there is provided a computer readable medium comprising computer program code stored thereon, the computer readable medium and computer program code being configured to, when run on at least one processor, perform the method of:
- in respect of spatial audio configured to be associated with a moveable, particular real-world object in a real-world scene, the spatial audio comprising audio that is for audible presentation such as to be perceived as originating from a particular direction in the real-world scene, a location of the particular real-world object determined based on identification of the particular real-world object in sensor data of the real-world scene to enable positioning of the particular direction of the spatial audio to correspond to the location of the particular real-world object in the scene, the sensor data obtained from at least one sensor having a sensor field of view that covers a limited region of the real-world scene at any one time;
- based on a current location of the particular real-world object being unknown by virtue of the particular real-world object not being identifiable in the sensor data;
- providing for audible presentation to a user of the spatial audio such that it is perceived as originating from a particular direction comprising a previously-determined-direction comprising a direction towards a previously determined location at which the real-world object was identified in the real-world scene and, based on one or both of a current field of view of the user and a current field of view of the sensor moving to a position that includes said previously determined location, providing for modification of the particular direction of the spatial audio from the previously-determined-direction to a direction outside the current field of view of the user at least until the particular real-world object is identified in the sensor data.

In a further aspect there is provided an apparatus, the apparatus comprising means configured to; in respect of spatial audio configured to be associated with a moveable, particular real-world object in a real-world scene, the spatial audio comprising audio that is for audible presentation such as to be perceived as originating from a particular direction in the real-world scene, a location of the particular real-world object determined based on identification of the particular real-world object in sensor data of the real-world scene to enable positioning of the particular direction of the spatial audio to correspond to the location of the particular real-world object in the real-world scene, the sensor data obtained from at least one sensor having a sensor field of view that covers a limited region of the real-world scene at any one time;

based on a current location of the particular real-world object being unknown by virtue of the particular real-world object not being identifiable in the sensor data;

provide for audible presentation to a user of the spatial audio such that it is perceived as originating from a particular direction comprising a previously-determined-direction comprising a direction towards a previously determined location at which the real-world object was identified in the real-world scene and, based on one or both of a current field of view of the user and a current field of view of the sensor moving to a position that includes said previously determined location, provide for modification of the particular direction of the spatial audio from the previously-determined-direction to a direction outside the current field of view of the user at least until the particular real-world object is identified in the sensor data.

The present disclosure includes one or more corresponding aspects, examples or features in isolation or in various combinations whether or not specifically stated (including claimed) in that combination or in isolation. Corresponding means and corresponding functional units (e.g., function enabler, spatial audio presenter, real-world object identifier, real-world object location tracker, orientation sensor) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Virtual reality (VR) may use a VR display comprising a headset, such as glasses or goggles or virtual retinal display, or one or more display screens that surround a user to provide the user with an immersive virtual experience. A virtual reality apparatus, which may or may not include the VR display, may provide for presentation of multimedia VR content representative of a virtual reality scene to a user to simulate the user being present within the virtual reality scene. Accordingly, in one or more examples, the VR apparatus may provide signalling to a VR display for display of the VR content to a user while in one or more other examples, the VR apparatus may be part of the VR display, e.g. part of the headset. The virtual reality scene may therefore comprise the VR content displayed within a three-dimensional virtual reality space so that the user feels immersed in the scene, as if they were there, and may look around the VR space at the VR content displayed around them. The virtual reality scene may replicate a real-world scene to simulate the user being physically present at a real-world location or the virtual reality scene may be computer generated or a combination of computer generated and real world multimedia content. Thus, the VR content may be considered to comprise the imagery (e.g. static or video imagery), audio and/or accompanying data from which a virtual reality scene may be generated for display. The VR apparatus may therefore provide the VR scene by generating the virtual, three-dimensional, VR space in which to display the VR content. The virtual reality scene may be provided by a panoramic video (such as a panoramic live broadcast), comprising a video having a wide or 360° field of view (or more, such as above and/or below a horizontally oriented field of view). A panoramic video may have a wide field of view in that it has a spatial extent greater than a field of view of a user or greater than a field of view with which the panoramic video is intended to be displayed.

The VR content provided to the user may comprise live or recorded images of the real world, captured by a VR content capture device, for example. An example VR content capture device comprises a Nokia Technologies OZO device. As the VR scene is typically larger than a portion a user can view with the VR display, the VR apparatus may provide, for display on the VR display, a virtual reality view of the VR scene to a user, the VR view showing only a spatial portion of the VR content that is viewable at any one time. The VR apparatus may provide for panning around of the VR view in the VR scene based on movement of a user's head and/or eyes. A VR content capture device may be configured to capture VR content for display to one or more users. A VR content capture device may comprise one or more cameras and, optionally, one or more (e.g. directional) microphones configured to capture the surrounding visual and aural scene from a capture point of view. In some examples, the VR content capture device comprises multiple, physically separate cameras and/or microphones. Thus, a musical performance may be captured (and recorded) using a VR content capture device, which may be placed on stage, with the performers moving around it or from the point of view of an audience member. In each case a consumer of the VR content may be able to look around using the VR display of the VR apparatus to experience the performance at the capture location as if they were present.

Augmented reality (AR) may use an AR display, such as glasses or goggles or a virtual retinal display, to augment a view of the real world (such as seen through the glasses or goggles) with computer generated or computer served content. An augmented reality apparatus, which may or may not include an AR display, may provide for presentation of multimedia AR content configured to be overlaid over the user's view of the real-world. Thus, a user of augmented reality may be able to view the real world environment around them, which is augmented or supplemented with content provided by the augmented reality apparatus, which may be overlaid on their view of the real world and/or aurally overlaid over an aural real world scene they can hear. The content may comprise multimedia content such as pictures, photographs, video, diagrams, textual information, aural content among others. Thus, while augmented reality may provide for direct viewing of the real world with the addition of computer generated graphics and/or audio content, a user of virtual reality may only be able to see content presented on the VR display of the virtual reality apparatus substantially without direct viewing of the real world. However, the VR content may comprise live content of a real-world scene and therefore such VR content may also be considered to be AR content because it may include content that augments a live view of the real-world on the VR display.

Augmented reality content (which includes virtual reality content that includes live imagery of the real-world in front of a user) may be provided with spatial audio having directional properties, such that the audio is presented in such a way that it is perceived to originate from a particular direction or point in space. The particular direction or point in space may be linked to a user's view of the real-world, such that the particular direction from which the spatial audio is perceived is positioned at a point linked to an object in the real-world. The spatial positioning of the spatial audio may be provided by the degree to which audio is presented to each channel of a multichannel audio arrangement, as well as by 3D audio effects, such as those that utilise a head related transfer function to create a spatial audio space in which audio can be positioned for presentation to a user. Spatial audio may be presented by headphones by using head-related-transfer-function (HRTF) filtering techniques or, for loudspeakers, by using vector-base-amplitude (VBA) panning techniques to position the perceived aural origin of the audio content.

In situations where the augmented reality content includes spatial audio and the positioning of the spatial audio is dependent on the position of a real-world object in a scene and the position of the real-world object in the scene is determined by a sensor having a limited field of view of the scene, the positioning of spatial audio may be problematic. In particular, the apparatus may not know where to position the spatial audio in space when the real-world object is outside the field of view of the sensor. If an object tracking system is used, such as a high accuracy indoor positioning system, to track the objects then the technical limitation of the sensors limited field of view does not exist and the system can "see" where the objects are at all times. However, setting up such object tracking systems is difficult and/or time consuming. Accordingly, managing the augmented reality experience provided to a user with object tracking hardware that has a limited field of view may be problematic.

Thus, we disclose an apparatus configured to augment a real-world scene in which a user is present by audibly presenting spatial audio to the user such that it is perceived to originate from real-world objects in the scene. The apparatus may use a sensor with a limited field of view of the real world scene in order to identify and track movable real-world objects in the real-world scene.

Figure 1:
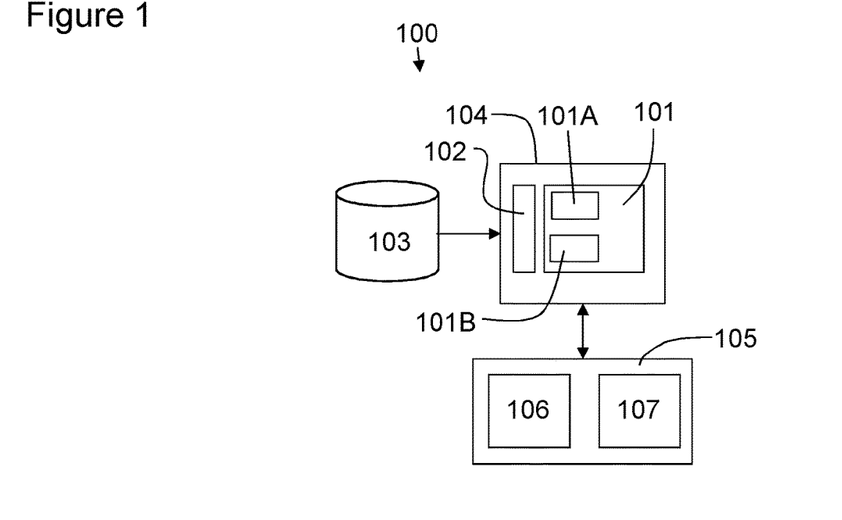
FIG. 1 illustrates an example apparatus for providing for presentation of augmented audio.

In the example of FIG. 1, a system 100 is shown illustrating an apparatus 101 for managing the audible presentation of spatial audio.

The apparatus 101 may comprise or be connected to a processor 101A and a memory 101B configured to execute computer program code. The apparatus 101 may have only one processor 101A and one memory 101B but it will be appreciated that other embodiments may utilise more than one processor and/or more than one memory (e.g. same or different processor/memory types). Further, the apparatus 101 may be an Application Specific Integrated Circuit (ASIC).

The processor may be a general purpose processor dedicated to executing/processing information received from other components, such as from a content store 103 and a real-world object identification module 102, in accordance with instructions stored in the form of computer program code in the memory. The output signalling generated by such operations of the processor is provided onwards to further components, such as to an augmented reality apparatus 104 for presentation of augmented reality content to a user.

The memory 101B (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the respective processors and memories are electrically connected to one another internally to allow for electrical communication between the respective components. In this example the components are all located proximate to one another so as to be formed together as an ASIC, in other words, so as to be integrated together as a single chip/circuit that can be installed into an electronic device. In some examples one or more or all of the components may be located separately from one another.

FIG. 1 shows the content store 103 which may store augmented reality content for presentation over a user's visual view and/or a user's aural appreciation of a real-word scene. In this example, the augmented reality content comprises at least spatial audio configured to be associated with a moveable, particular real-world object in the real-world scene around the user. Accordingly, the user's appreciation of the real-world scene around them may be augmented by the spatial audio. The spatial audio may comprise pre-recorded audio of real-world sounds, computer synthesised audio or perhaps audio, modified or not, based on audio from elsewhere in the real-world scene. As an example, spatial audio comprising a monologue may be associated with a particular person in the real-world scene which augments the sounds heard in the real-world scene and may be assumed by the user to be the thoughts of the particular person. In another example, the spatial audio may comprise a sound effect associated with a particular person that the user may know is associated with that particular person and therefore the sound effect may provide an audible marker as to the whereabouts of the particular person. The AR content, or particularly the spatial audio, may include identification data that specifies a real-world object that may be present in the real-world scene and to which the spatial audio should be associated. The identification data may identify a particular person, a type of person (e.g. man/woman/child), a particular object, a type of object (e.g. a ball, a drone) or any other thing that may be movable under its own power or moved by another object in the scene. In other examples, the AR content does not include identification data and instead the apparatus 101 or other apparatus may decide which real-world object in the real-world scene to associate with the spatial audio. Thus, the spatial audio may comprise guitar music and if a guitar is identified in the real-world scene the guitar music, being spatial audio, is presented such that it is perceived as originating from the location of the real-world guitar. In another example, the spatial audio may comprise a temporally short piece of music, jingle or sound effect for association with a particular person. If that particular person is identified in the real-world scene the music, jingle or sound effect may be presented such that it is perceived as originating therefrom.

The apparatus 101, in this example, forms part of an augmented reality apparatus 104 for presenting at least spatial audio in augmented reality. In one or more other examples, the apparatus 101 may form part of a VR apparatus wherein the VR apparatus is provided with VR content comprising live imagery of the real-world scene in which the user is located. In one or more examples, the apparatus 101 may be independent of an AR or VR apparatus and may be in communication therewith to perform its function and provide for presentation of the AR content to the user. In this example, the processor 101A and memory 101B is shared by the AR apparatus 104 and the apparatus 101, but in other examples, they may have their own processors and/or memory.

The apparatus 101 and AR apparatus 104 may provide for aural presentation of the spatial audio using an AR headset 105, which, in this example, includes headphones 106.

The real-world object identification module 102 may provide for the identification of objects in the real-world scene for the apparatus 101. The real-world object identification module 102 may provide for the automatic identification of objects in the real-world scene such that they can be identified position of the objects can be tracked. The real-world object identification module 102 may be configured to receive sensor data from a sensor 107. The sensor data may be indicative of the location of real-world objects in the real-world scene. The real-world object identification module 102 may process the sensor data to identify the location of real-world objects in the scene. In this example, the apparatus 101 is configured to receive information indicative of the location of real-world objects from the real-world object identification module 102 so that the spatial audio can be associated with those objects, as required.

In one or more examples, the function of the real-world object identification module 102 may be performed by the apparatus 101.

In this example, the sensor 107 is mounted to the AR headset 105, although in other examples, the sensor 107 may be mounted elsewhere, either associated with the user or remote from the user of the AR headset 105.

As mentioned above the location of the particular real-world object may be determined based on automatic identification of the particular real-world object in the sensor data of the real-world scene to enable the apparatus 101 to position the particular direction of the spatial audio to correspond to the location of the particular real-world object in the scene, such that the spatial audio is perceived from the intended direction. The sensor 107 has a sensor field of view that covers a limited region of the real-world scene at any one time. The sensor field of view may correspond to the field of view that the user may have of the real-world scene, e.g. based on average human vision. In one or more examples, the sensor field of view may overlap with the field of view of the user, such as by virtue of the sensor pointing in the same direction as the user's head when mounted on the AR apparatus 105. In one or more examples, the sensor field of view may be configured to be substantially centred on the user's field of view. In one or more examples, the sensor field of view may be configured to be substantially centred on and wider or narrower than the user's field of view. Providing a sensor having a slightly wider field of view may be advantageous as the resulting sensor data will include parts of the real-word scene just out of view of the user which can be analysed for particular real-world objects prior to said objects coming into the user's field of view.

The sensor 107 is configured to provide sensor data from which the apparatus 101 may obtain information about the location of real-world objects in the scene. The sensor 107 may comprise a single sensor or multiple sensors, although total field of view of the scene provided by the one or more sensors is less than the total spatial extent of the real-world scene. In one or more examples, based on the real-world scene extending in directions extending over a horizontally oriented plane and 360 degrees around the user, the one or more sensors may be configured and arranged to simultaneously capture a region of the real-world scene covering less than said 360 degrees, such as less than 270, 180 or 150 degrees. Accordingly, the field of view of the one sensor or the combined field of view of more than one sensor may be less than the whole real-world scene or less than 360 degrees around the user.

The sensor 107 may comprise a camera and the sensor data may therefore comprise camera imagery of the real-world scene. The camera will have a field of view over which the camera imagery is captured at any one time. The automatic identification of the particular real-world object, in this example, therefore comprises the automatic visual identification of the particular real-world object in the camera imagery. The camera may comprise a visible light camera or infra-red, ultra violet or other electromagnetic wavelength camera.

Alternatively or additionally, the sensor 107 comprises an audio sensor array and the sensor data generated thereby comprises an audio map of the real-world scene comprising the directions from which audio is received from the real-world scene. The sensor field of view comprising the field of view of the audio sensor array in terms of the area over which the audio sensor array may detect audio from the real-world scene. The audio sensor array may therefore comprise an array of directional microphones pointing in different directions over the field of view and configured to determine the direction from which sounds are received to provide an audio picture or map of the scene. The automatic identification of the particular real-world object may therefore comprise automatic audio identification of the particular real-world object in the audio map. In other examples, the sensor comprises a radar or sonar sensor, configured to generate sensor data representative of objects present in the scene.

Whatever type of sensor or sensors are used, the sensor data may be representative of the contents, at least in terms of movable objects, present in the real-world scene around the user. The Tango platform by Google is an example of a system that may provide functionality for a map of the real-world scene to be created from a sensor having a limited field of view of said real-world scene at any one time.

The operation of the apparatus 101 will be described in more detail below. However, in summary; based on a current, live location of the particular real-world object being unknown by virtue of the particular real-world object not being currently identifiable in the sensor data from the sensor 107, the apparatus 101 may be caused to provide for audible presentation to the user of the spatial audio from the content store 103 with its particular direction comprising a previously determined direction, which may comprise a last-known-direction. The previously determined direction comprises a direction at which the real-world object was identified in the real-world scene at a previous time, such as in the recent past, such as by the real-world object identification module 102 or the user. The last-known-direction comprises the direction towards the last known location (e.g. most recently determined direction) at which the real-world object was identified in the real-world scene, such as by the real-world object identification module 102 or the user. When the user happens to move their current field of view of the scene to a position that includes said previously determined direction or last known location, the apparatus is caused to provide for modification of the particular direction from which the spatial audio is perceived from the last-known-direction to a direction outside the current field of view of the user at least until the particular real-world object is identified in the sensor data.

In the examples and description that follows, the apparatus 101 may be caused to provide for audible presentation to the user of the spatial audio with its particular direction comprising the last-known-direction when the current location is unknown. However, it will be appreciated that the apparatus 101 may use a previously determined direction that may not be the last-known-direction. This may provide the technical effect of avoiding a miss-match between where the object was assumed to be, i.e. the last-known-direction, and where it has moved to, when relying upon sensor data to track the object that has a limited field of view that did not include the object for a period of time. Thus, when the sensor field of view does not include the moveable real-world object, the real-world object may be moving around the scene unbeknown to the apparatus. While the user is unable to see the real-world object in their field of view, it may be inconsequential to the user's appreciation of the augmented reality content if the spatial audio is presented as originating from the last known location of the real-world object, which may or may not be equivalent to the real-world object's actual location depending on whether the real-world object is moving about or has been moved. However, if the users moves their field of view to include the last known location and the real-world object is not in that position anymore because the object has moved unbeknown to the apparatus, the user may notice that the spatial audio is not positioned to correspond to the location of the real-world object, leading to possible confusion or dismay. The apparatus may provide the technical effect of improved presentation of spatial audio when the real-world object with which the audio is associated is moveable and not motion tracked all of the time or only over a limited region of the scene at any one time.

Figure 2:
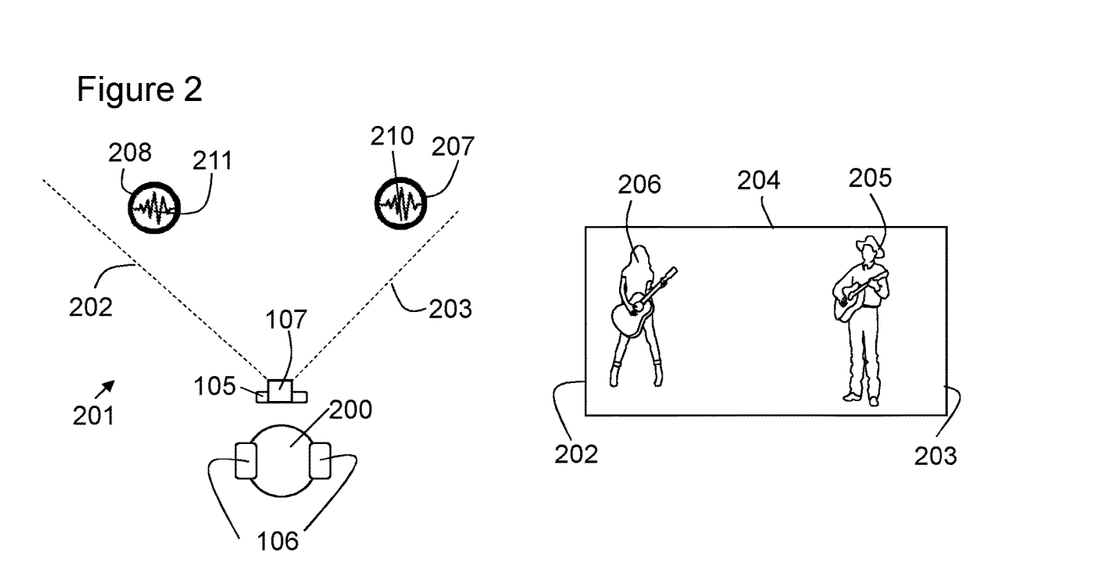
FIG. 2 shows an example diagrammatic plan view of a real-world scene as well as a user's current view of said real-world scene from their point of view in a first configuration.

FIG. 2 shows an example plan view of the user 200 in the real-world scene 201. The user is using the AR headset 105, which may comprise augmented reality glasses in this example.

The user is also wearing headphones 106 so that they can be presented with spatial audio. Dashed lines 202, 203 illustrate the user's field of view of the real-world scene 201. In this example, the field of view of the sensor 107 is positioned and configured to be substantially equivalent to the field of view of the user 200. Accordingly, the dashed lines 202, 203 may also represent the field of view of the sensor 107.

FIG. 2 also shows the user's view 204 of the real-world scene 201. Accordingly, the dashed lines 202, 203 correspond to the left and right hand side edges of the user's view 204. The user can see two movable real-world objects in their view 204 comprising a first object 205 and a second object 206. The first object 205 comprises a first musician pretending to play a guitar. The second object 206 comprises a second musician also pretending to play a guitar. The AR content may comprise professional guitar music that can be associated with the first and second objects 205, 206 to make it appear that the first and second musicians are playing very competently.

The position of the first and second objects 205, 206 are shown diagrammatically in the plan view as circles 207, 208 respectively.

In the configuration shown in FIG. 2, the objects 205, 206 are within the field of view of the sensor 107 and, accordingly, the location of the first and second objects may be determinable by the real-world object identification module 102. The real-world object identification module 102 may use one or more of object recognition, facial recognition, gait recognition or any other technique to identify objects in the scene in order to provide their location to the apparatus 101 or AR apparatus 104. The AR content in this example includes spatial audio comprising a first spatial audio track and a second spatial audio track for association with the first and second objects 205, 206 respectively. The apparatus 101 or AR apparatus 104 may provide for audible presentation of the first spatial audio track, represented by first sound wave icon 210, with a particular direction such that it is perceived to originate from a direction corresponding to the first object 205/207 relative to the view of the user. The apparatus 101 or AR apparatus 104 may provide for audible presentation of the second spatial audio track, represented by second sound wave icon 211, with a particular direction such that it is perceived to originate from a direction corresponding to the second object 206/208 relative to the view of the user. Accordingly, the first and second icons 210, 211, representing the location from which the spatial audio track is perceived to be heard, are shown overlapping the physical location of the real-world object with which they are associated. The audio tracks may be considered to be presented diagetically. It will be appreciated that the apparatus 101 or AR apparatus 104 may use a HRTF or VBA panning technique to position the perceived origin of the spatial audio tracks, rather than physically providing a speaker at the physical location of the real-world object. Provided that the first and second real-world objects 205, 207; 206, 208 remain within the field of view of the sensor 107, the identity of the objects and therefore their location in the real-world scene can be tracked by the real-world object identification module 102. The location of the objects may then be reported to the apparatus 101 or AR apparatus 104 such that the perceived particular location of the first spatial audio track and a second spatial audio track may be positioned according to the current location of the objects. The AR headset 105 may include orientation sensors, such as accelerometers, to monitor the direction of the viewing direction of the user's point of view. Accordingly, based on the viewing direction of the user's view, the apparatus 101 or AR apparatus 104 may adjust the particular direction of each of the audio tracks to take account of user's viewing direction. Thus, the AR apparatus 104 or apparatus 101 may, based on location of the one or more moveable real-world objects in the scene reported by the real-world object identification module 102 and the orientation of the user's head reported from one or more orientation sensors provide for determination of the direction to the objects relative to the user's head. This direction to the objects relative to the user's head may then be used as the particular direction from which the one or more spatial audio tracks are perceived to originate.

Figure 3:
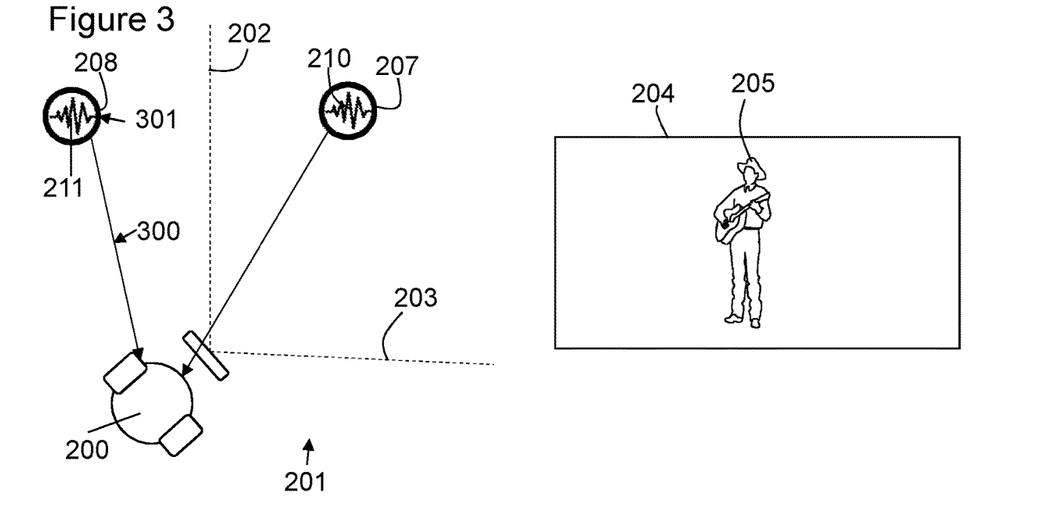
FIG. 3 shows an example diagrammatic plan view of a real-world scene as well as a user's current view of said real-world scene from their point of view in a second configuration

The example of FIG. 3 shows a similar view to FIG. 2, with a plan view of the real-world scene 201 and the user's view 204. In this figure, the user has changed their viewing direction of the real-world scene by rotating their head to the right, for example to focus on the first musician 205. The movement of the user's viewing direction happens to have resulted in the second object 206 no longer being in the field of view 202, 203 of the sensor 107 (as well as not being in the user's field of view). Thus, the current location of the second real-world object 206 is now unknown because the second real-world object 206 is not present in the field of view of the sensor 107 and is therefore not currently identifiable in the sensor data from the sensor 107. Nevertheless, the apparatus 101 or AR apparatus 104 may continue to provide for audible presentation to the user 200 of the second spatial audio track with its particular direction comprising a last-known-direction 300 comprising the direction towards the last known location 301, at which the second real-world object 206 was identified in the real-world scene. Thus, the circle 208 shows that the current location of the second object happens to have remained at the last known location 301, determined by the real-world object identification module 102 when the object 206 was in the field of view of the sensor 107, or based on user input. The position of the second icon 211 relative to the last known location 301 shows that the second audio track is audibly presented such that it is perceived to originate from the direction 300 towards the last known location 301.

While the second object 206 is outside the field of view of the sensor 107, the second object may move about the scene 201 unbeknown to the apparatus 101 or AR apparatus 104. Thus, while the second object 206 is outside the field of view of the sensor 107, the apparatus 101 or AR apparatus 104 may be configured to use the last known location irrespective of the actual location of the second object 206. A direction towards the last known location relative to the user's head may still be determined from the data from the orientation sensor such that the second audio track 206 is perceived to originate from the, fixed, last known location relative to the real-world scene 201.

The first real-world object 205 is still within the field of view of the sensor 107 and accordingly any movement of the first object 205 may be tracked and the particular direction of the first spatial audio track can be presented to track the position of the first object 205.

Figure 4:
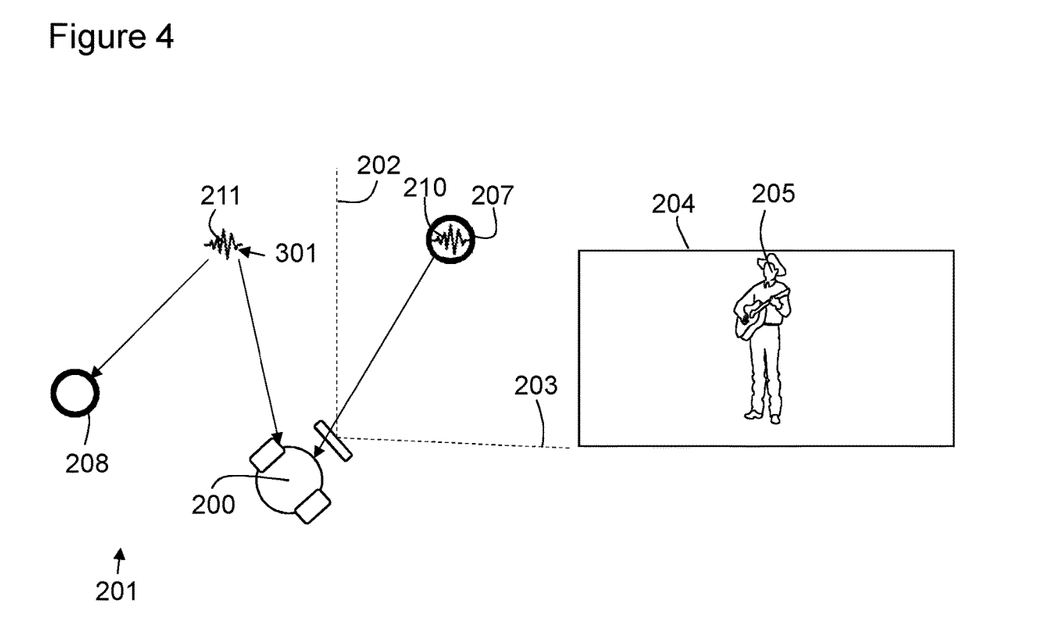
FIG. 4 shows an example diagrammatic plan view of a real-world scene as well as a user's current view of said real-world scene from their point of view in a third configuration.

The example of FIG. 4 shows the user's viewing direction unchanged from FIG. 3, but shows that the second object 206 has moved in the real-world scene 201. The actual current position of the second object 206 is shown by the location of the second circle 208. This movement of the second object 206 in the scene is unknown to the AR apparatus 104 or apparatus 101 due to the limited field of view 202, 203 of the sensor 107. Thus, the AR apparatus 104 or apparatus 101 continues to present the second spatial audio track, represented by icon 211, from the last known location 301. It will be appreciated that this particular direction for presentation of the second spatial audio track, now that the second object 206 has moved, is inaccurate. However, as the second object 206 is also out of view for the user (the second object 206 is not present in view 204), this inaccuracy may not disrupt the user's appreciation of the AR content.

It will now be described what may happen if the user looks back towards where the first object 206 used to be positioned and thus to the last known location 301 from where the user perceives the second spatial audio track, shown by the icon 211.

Figure 5:
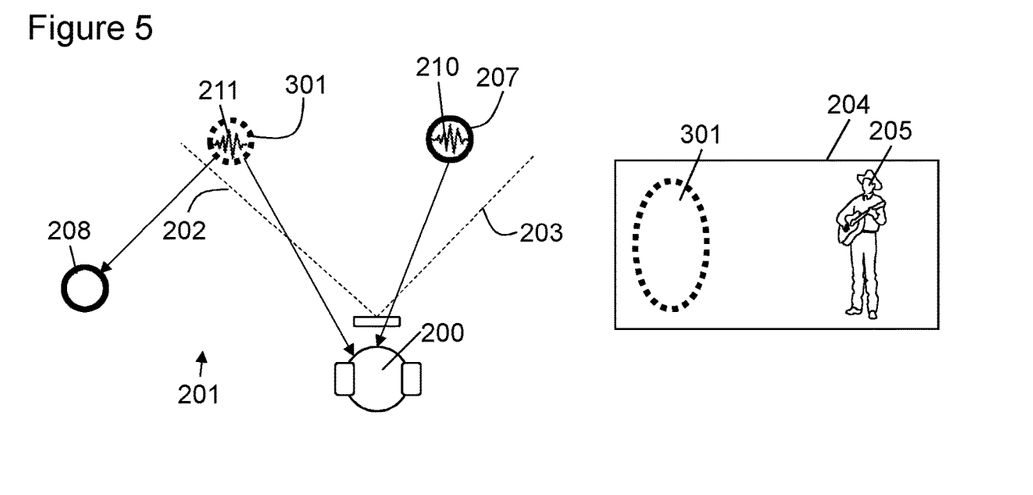
FIG. 5 shows an example diagrammatic plan view of a real-world scene as well as a user's current view of said real-world scene from their point of view in a fourth configuration.

The example of FIG. 5 shows the user having changed their viewing direction back to the direction shown in FIG. 2. Accordingly, the user has moved their current field of view 202, 203 to a position that includes said last known location 301 (shown by dashed lines). However, as mentioned above the second object 206 is currently no longer at the last known location and is at the location shown by circle 208. The user may therefore notice a miss-match between the direction in which they perceive the second spatial audio track, shown by icon 211, and the second object (at location 208 which they currently cannot see).

Figure 6:
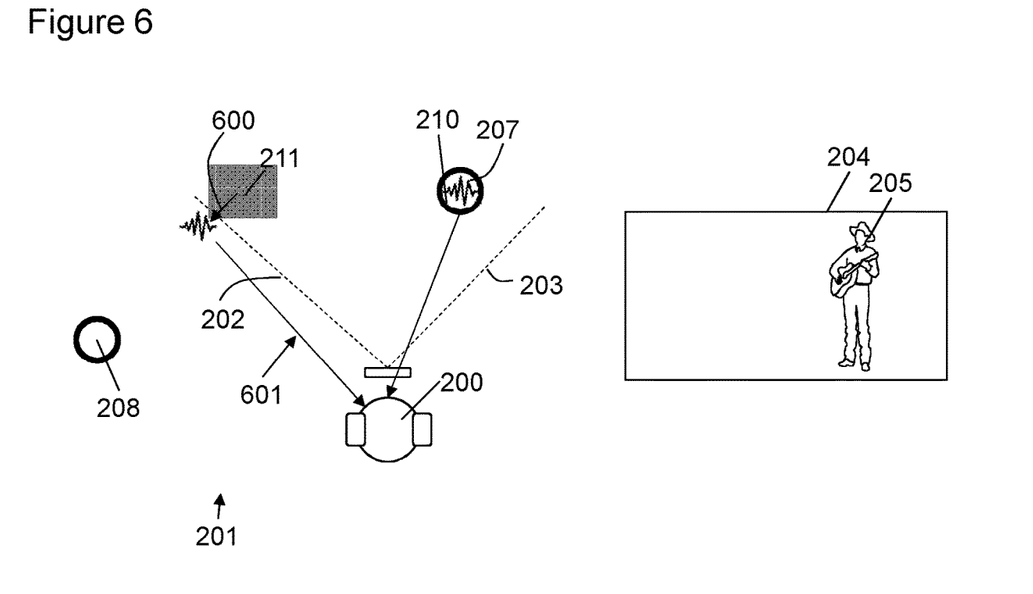
FIG. 6 shows an example diagrammatic plan view of a real-world scene as well as a user's current view of said real-world scene from their point of view in a fifth configuration.

The example of FIG. 6 illustrates an example modification performed by the apparatus 101 to possibly compensate for the limited field of view of the sensor 107.

The example of FIG. 6 illustrates the same situation as described for FIG. 5. The user has looked back towards where they perceive the audible presentation of the second spatial audio track, shown by icon 211, and, as such, their field of view 202, 203 includes the last known location. The apparatus 101 is caused to provide for modification, shown by arrow 600, of the particular direction of the second spatial audio track from the last-known-direction to a direction 601 outside the current field of view 202, 203 of the user at least until the second real-world object 206 is (e.g. automatically) identified in the sensor data from the sensor 107. Thus, while the apparatus 101 and AR apparatus 104 are not provided with or cannot determine an updated location of the second object 206 from the last known location, the apparatus 101 may provide for maintaining presentation of the spatial audio as perceived from a particular direction, but that particular direction may be modified to a location out of the user's current field of view. As mentioned above, the field of view of the sensor(s) that capture the sensor data may be the same, wider or narrower than the field of view of the user 200. If the sensor data represents a field of view wider than that of the user's field of view, the apparatus 101 may be able to determine the presence of the second object 206 just before the particular direction is within the user's field of view. This wider field of view covered by the sensor data may provide more processing time for identifying whether or not the object has moved from its last known location.

In this example, the apparatus 101 is caused to modify the particular direction from which the second audio track is perceived to originate to a direction within a predetermined angular threshold distance of the edge 202 of the user's field of view, e.g. just out of view. The angular threshold distance may be up to 1, 2, 5, 10, 15, 20 or 30 degrees or between any two of these example angular thresholds. The edge 202 may be determined based on which edge of the user's field of view is first incident with the last known location during movement of their field of view to include the last known location. Accordingly, for the user, they will perceive the second audio track as being heard from a direction just outside their field of view 202, 203.

Figure 7:
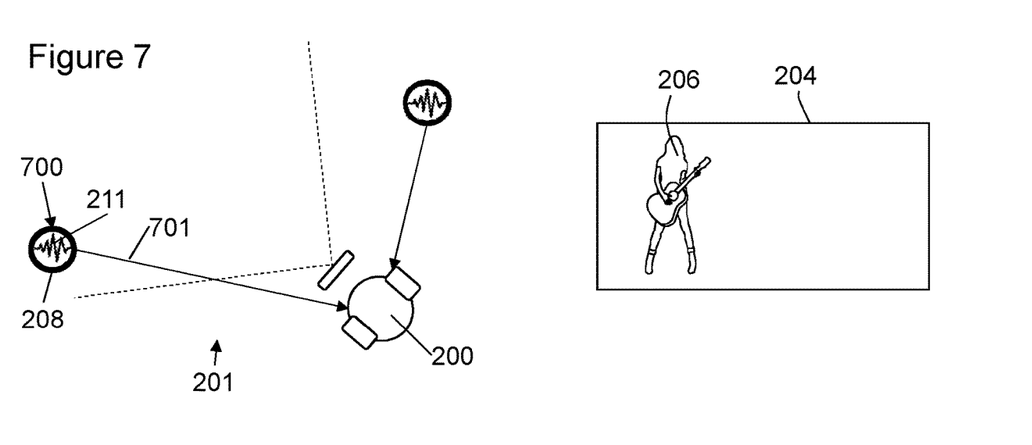
FIG. 7 shows an example diagrammatic plan view of a real-world scene as well as a user's current view of said real-world scene from their point of view in a sixth configuration.

The example of FIG. 7 shows the user having turned their field of view to include the current position 700 of the second object 206 represented by the circle 208. The particular direction 701 of the second audio track 211 is shown corresponding to the current position 700 once again.

In one or more examples, once the second real-world object 206 is automatically identified in the sensor data from the sensor 107, the particular direction from which the second audio track is perceived to originate may be modified to once again correspond to the current direction towards the second object. Thus, after the modification of the particular direction and based on identification of the real-world object in the sensor data yielding a current location of the real-world object more recent than the location that gave the last known direction, the apparatus 101 may be caused to provide for further modification of the particular direction of the spatial audio to correspond to the determined current location of the real-world object 206.

While in some examples, on (e.g. automatic) identification of the second object, the particular direction from which the second audio track is perceived to originate may be modified to once again correspond to the current direction towards the second object 206, in other examples, the apparatus 101 may perform other actions. For example, the spatial audio may be presented as ambient audio, without a particular direction from which it is perceived to originate and may be presented to the user, instead, as omnidirectional, ambient audio. In one or more examples, the spatial audio track may be audibly presented with a particular direction that has a greater spatial extent, i.e. rather than being perceived to come from a specific, narrow direction, the spatial audio track is perceived as originating from a wider field and therefore a more general direction. This may be achieved using HRTF techniques or decorrelation techniques, which may have the effect of audibly presenting a plurality of copies of the spatial audio track such that they are each perceived to originate from different directions around the direction towards the object, as will be known to those skilled in the art of the presentation of spatial audio.

Figure 8:
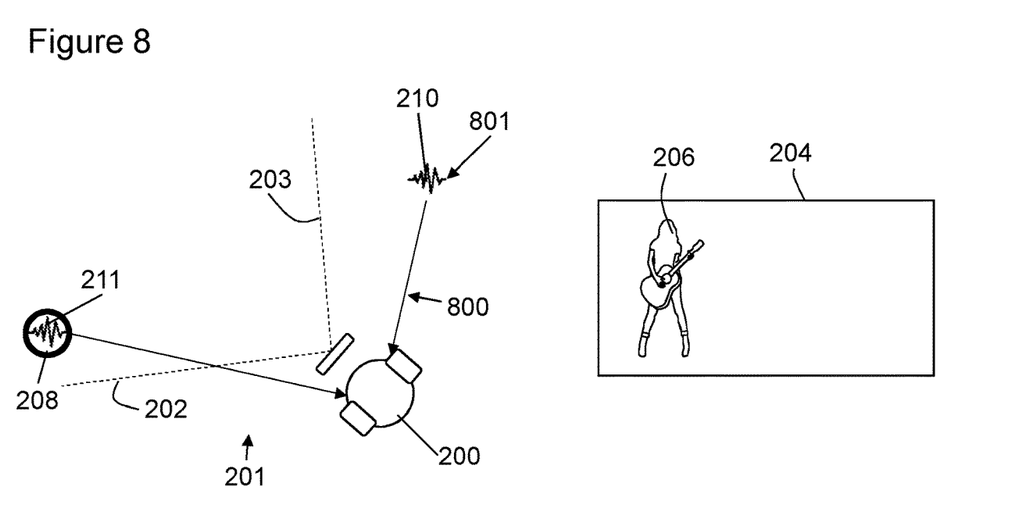
FIG. 8 shows an example diagrammatic plan view of a real-world scene as well as a user's current view of said real-world scene from their point of view in a seventh configuration.

The example of FIG. 8 shows a similar view to FIG. 7. In FIG. 8, the first object 205 is not within the field of view 201, 202 of the sensor 107. Accordingly, the location of the first object 205 is unknown to the apparatus 101. As before, described in relation to the second object 206, the first spatial audio track may be audibly presented having a particular direction 800 such that it is perceived to originate from the last known location 801 of the first object 205. However, FIG. 8 illustrates the situation where, unbeknown to the apparatus 101, the first object 205 has left the real-world scene 201 altogether. Accordingly, the circle 207 is absent from the plan view of FIG. 8 as the current location of the first object 205 is not in the real-world scene 201.

In one or more examples, based on the current location of either of the real-world objects 205, 206 remaining unknown by virtue of the real-world object not being identified in the sensor data for a predetermined period of time, the apparatus 101 may be caused to provide for i) presentation of the spatial audio without a particular direction such that the source of the spatial audio is perceived to be ambient, omnidirectional audio; or ii) ceasing the presentation of the spatial audio. In one or more examples, the apparatus 101 may make modifications to the presentation of the spatial audio based solely on the period of time the location of the real-world object remains unknown.

In one or more examples, the apparatus 101 may make modifications to the presentation of the spatial audio based on the sensor 107 having scanned the real-world scene 201 and the real world object not being identified in the sensor data therefrom.

Figure 9:
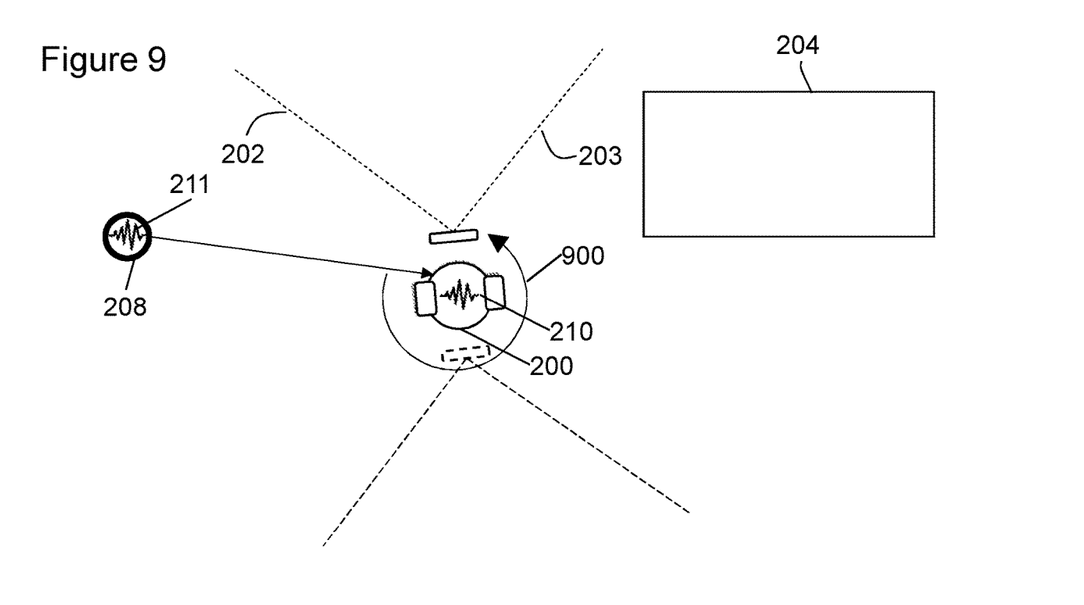
FIG. 9 shows an example diagrammatic plan view of a real-world scene as well as a user's current view of said real-world scene from their point of view in an eighth configuration.

The example of FIG. 9 shows the user 200 having looked around the whole of the real-world space 201, shown by arrow 900 illustrating a recent change of the user's field of view and therefore the sensor's field of view. It will be appreciated that the length of time it takes the field of view of the sensor 107 to scan the real-world scene affects the probability the sensor 107 will "see" the first object 205 if the first object is moving about the scene. This is because the sensor 107 may simply not see the first object because the first object may be moving in the scene and happen not to be within the scanned region of space at the time the field of view of the sensor 107 was there. However, if the field of view of the sensor 107 does scan a predetermined portion, such as a majority or all of the real-world scene, within a predetermined time and the location of the first object is not automatically identified in the sensor data, the apparatus 101 may conclude that the first object is not in the scene. The predetermined time may be less than 1 minute, 45, 30, 20, 10 or 5 seconds or any other value. The predetermined time may be determined based on a measure of the movement of objects in the scene. Thus, if the sensor data reveals fast moving objects in the scene, the predetermined time may be reduced, while if the objects are slow moving the predetermined time may be increased. It will be appreciated that due to the limited field of view of the sensor 107 and the fact the objects in the scene are movable, it may be difficult to conclude with absolute certainty that an object has left the scene. However, in this example, the apparatus 101 is configured to make such a (possibly inaccurate) conclusion based on the scanning of the predetermined portion of the scene within the predetermined time period.

If the apparatus 101 determines that the real-world object 205 has left the real-world scene it may be configured to provide for presentation of the spatial audio without a particular direction such that the spatial audio is perceived without a specific source direction, such as ambient audio. The audio track may be considered to be presented non-diagetically. Accordingly, it may no longer be appropriate for the apparatus 101 to audibly present the first audio track as spatial audio if the apparatus 101 cannot be sure the real-world object is present. In one or more other examples, the apparatus 101 may be configured to provide for termination of the presentation of the first spatial audio track. FIG. 9 illustrates the presentation of the first spatial audio track 210, previously for association with the first object 205, as ambient audio and, as such, the icon 210 is shown as located in the head of the user 200 to illustrate the omnidirectional, ambient audible presentation of the first spatial audio track.

In one or more examples, the first real-world object 205 may return to the scene 201. It will be appreciated that this includes the situation where the apparatus 101 inaccurately concluded that the first object had left the scene when in fact it was simply not seen in the sensor data over the predetermined portion of the scene in the predetermined time but was present in the scene. The apparatus may, based on the real-world object having returned to the real-world scene 201 determined at least by virtue of the automatic identification of the particular real-world object in the sensor data from sensor 107 of the real-world scene 201, be configured to provide for the presentation of the spatial audio with a particular direction corresponding to a direction towards the returned real-world object from a point of view of the user 200. Thus, once the apparatus 101 receives notice from the real-world object identification module 102 of the location of the returned first object 205, it may provide for presentation of the corresponding spatial audio track as spatial audio, that is with a particular perceived audible direction of origin corresponding to said location.

Figure 10:
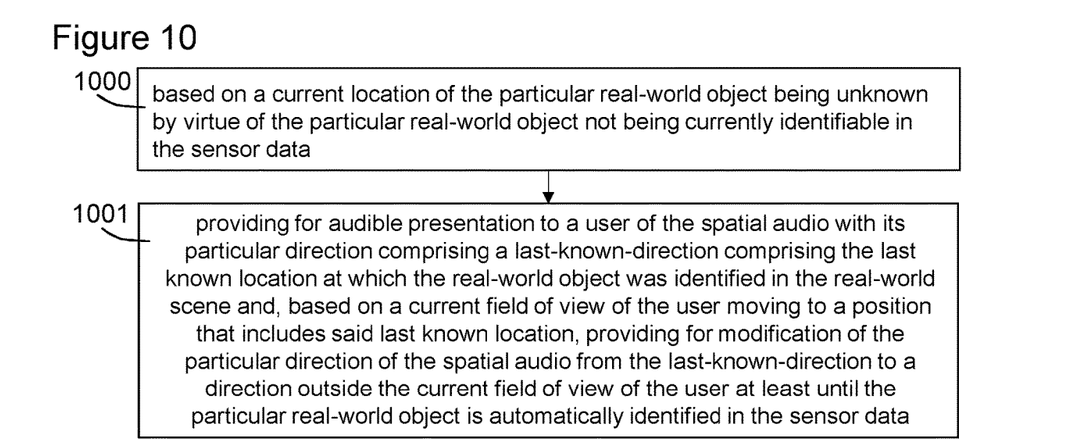
FIG. 10 shows a flowchart illustrating an example method.

The example of FIG. 10 shows a flow diagram illustrating the steps of,
- in respect of augmented reality content comprising at least spatial audio configured to be associated with a moveable, particular real-world object in a real-world scene, the spatial audio comprising audio that is for audible presentation such as to be perceived as originating from a particular direction in the real-world scene, the location of the particular real-world object determined based on automatic identification of the particular real-world object in sensor data of the real-world scene to enable the positioning of the particular direction of the spatial audio to correspond to the location of the particular real-world object in the scene, the sensor data obtained from at least one sensor having a sensor field of view that covers a limited region of the real-world scene at any one time;
- based on 1000 a current location of the particular real-world object being unknown by virtue of the particular real-world object not being currently identifiable in the sensor data;
- providing for 1001 audible presentation to a user of the spatial audio with its particular direction comprising a last-known-direction comprising the last known location at which the real-world object was identified in the real-world scene and, based on a current field of view of the user moving to a position that includes said last known location, providing for modification of the particular direction of the spatial audio from the last-known-direction to a direction outside the current field of view of the user at least until the particular real-world object is automatically identified in the sensor data.

Figure 11:
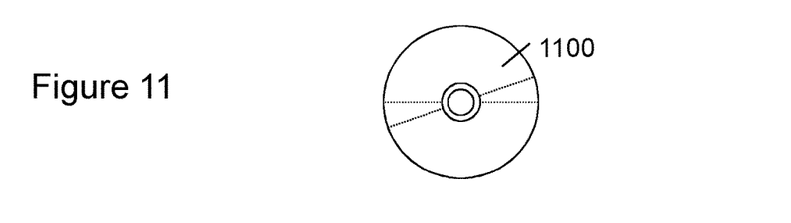
FIG. 11 shows a computer readable medium.

FIG. 11 illustrates schematically a computer/processor readable medium 1100 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures. User input may be used, such as initially, to identify the real-world objects 205, 206 in the scene and associate the spatial audio with the object. Tracking of the location of the object may then, subsequently, be performed automatically based on the sensor data from sensor 107.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same. Thus, the apparatus may be embodied in a non-portable device, but provide for the presentation of the spatial audio from a portable device of the user.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
at least one processor; and
at least one memory including computer program code, the at least one memory and the computer program code configured to, with the at least one processor, cause the apparatus to perform at least the following:
receive spatial audio configured to be associated with a moveable, particular real-world object in a real-world scene, the spatial audio comprising audio that is for audible presentation such as to be perceived as originating from a particular direction in the real-world scene;
determine a location of the particular real-world object based on identification of the particular real-world object in sensor data of the real-world scene and enable the apparatus to position the particular direction of the spatial audio to correspond to the location of the particular real-world object in the real-world scene, the sensor data obtained from at least one sensor having a sensor field of view that covers a limited region of the real-world scene at any one time;
based on a current location of the particular real-world object being unknown by virtue of the particular real-world object not being identifiable in the sensor data;
provide for audible presentation to a user of the spatial audio such that the spatial audio is perceived as originating from a particular direction comprising a previously-determined-direction comprising a direction towards a previously determined location at which the real-world object was identified in the real-world scenes; and
based on one or both of a current field of view of the user and a current field of view of the sensor moving to a position that includes said previously determined location, provide for modification of the particular direction of the spatial audio from the previously-determined-direction to a direction outside the current field of view of the user at least until the particular real-world object is identified in the sensor data.

2. The apparatus of claim 1, wherein after the modification of the particular direction and based on identification of the real-world object in the sensor data and determination of a current location of the real-world object, the apparatus is caused to provide for further modification of the particular direction of the spatial audio to correspond to the determined current location of the real-world object.

3. The apparatus of claim 1, wherein after the modification of the particular direction and based on the current location of the real-world object being unknown for a predetermined period of time by virtue of the real-world object not being identified in the sensor data for a predetermined period of time, the apparatus is caused to provide for at least one of:
presentation of the spatial audio without a particular direction such that the source of the spatial audio is perceived as ambient audio; or
ceasing the presentation of the spatial audio.

4. The apparatus of claim 1, wherein the limited region of the real-world scene captured by the sensor in the sensor data is based on the current field of view of the user such that there is at least a partial overlap between the sensor's current field of view and the user's current field of view.

5. The apparatus of claim 1, wherein based on the real-world object not being identifiable in the real-world scene determined by virtue of a determination that at least a predetermined amount of the real-world scene has been covered in the sensor data within a recent predetermined time period and the real-world object has not been identified in said recent predetermined time period, provide for at least one of:
presentation of the spatial audio without a particular direction such that the spatial audio is perceived as ambient audio; or
termination of the presentation of the spatial audio.

6. The apparatus of claim 5, wherein based on the real-world object having returned to the real-world scene determined at least by virtue of the automatic identification of the particular real-world object in the sensor data of the real-world scene, provide for presentation of the spatial audio with a particular direction corresponding to a direction towards the returned real-world object from a point of view of the user.

7. The apparatus of claim 1, wherein the modification of the particular direction of the spatial audio from the previously-determined-direction to the direction outside the current field of view of the user comprises modification of the particular direction to a direction within a threshold angle of an edge of the field of view of the user, such that the spatial audio is perceived by the user as originating from a direction just out of view of the user.

8. The apparatus of claim 1, wherein the apparatus further comprises one of:
- an augmented reality device having speakers for presentation of the spatial audio, the augmented reality device configured to allow the user a view of the real-world scene before them;
- a virtual reality device configured to provide a virtual reality view, captured by a camera, of the real-world scene to the user, the virtual reality view defining the current field of view of the user and the virtual reality device having speakers for presentation of the spatial audio; or
- an apparatus in communication with said augmented reality device or said virtual reality device.

9. The apparatus of claim 1, wherein the spatial audio is presented using one of head-related-transfer-function filtering or vector-base-amplitude panning to position the perceived aural origin of the spatial audio at the particular direction.

10. The apparatus of claim 1, wherein the sensor comprises at least one of:
- a camera and the sensor data comprises camera imagery of the real-world scene, the sensor field of view comprising the field of view of the camera, and the identification of the particular real-world object comprises automatic visual identification of the particular real-world object in the camera imagery by a real-world object identification module in communication with the apparatus; or
- an audio sensor array and the sensor data comprises an audio map of the real-world scene comprising the directions from which audio is received from the real-world scene, the sensor field of view comprising the field of view of the audio sensor array in terms of the area over which the audio sensor array may detect audio from the real-world scene, and the automatic identification of the particular real-world object comprises automatic audio identification of the particular real-world object in the audio map by a real-world object identification module in communication with the apparatus.

11. The apparatus of claim 1, wherein the spatial audio is associated with identification data, the identification data defining the real-world object with which the spatial audio should be associated.

12. A method, the method comprising:
- receiving spatial audio configured to be associated with a moveable, particular real-world object in a real-world scene, the spatial audio comprising audio that is for audible presentation such as to be perceived as originating from a particular direction in the real-world scene;
- determining a location of the particular real-world object based on identification of the particular real-world object in sensor data of the real-world scene enabling positioning of the particular direction of the spatial audio to correspond to the location of the particular real-world object in the scene, the sensor data obtained from at least one sensor having a sensor field of view that covers a limited region of the real-world scene at any one time;
- based on a current location of the particular real-world object being unknown by virtue of the particular real-world object not being identifiable in the sensor data, providing for audible presentation to a user of the spatial audio such that the spatial audio is perceived as originating from a particular direction comprising a previously-determined-direction comprising a direction towards a previously determined location at which the real-world object was identified in the real-world scene; and
- based on one or both of a current field of view of the user and a current field of view of the sensor moving to a position that includes said previously determined location, providing for modification of the particular direction of the spatial audio from the previously-determined-direction to a direction outside the current field of view of the user at least until the particular real-world object is identified in the sensor data.

13. The method of claim 12, wherein after the modification of the particular direction and based on identification of the real-world object in the sensor data and determination of a current location of the real-world object, providing for further modification of the particular direction of the spatial audio to correspond to the determined current location of the real-world object.

14. The method of claim 12, wherein after the modification of the particular direction and based on the current location of the real-world object being unknown for a predetermined period of time by virtue of the real-world object not being identified in the sensor data for a predetermined period of time, providing at least one of:
- presentation of the spatial audio without a particular direction such that the source of the spatial audio is perceived as ambient audio; or
- ceasing the presentation of the spatial audio.

15. The method of claim 12, wherein the limited region of the real-world scene captured by the sensor in the sensor data is based on the current field of view of the user such that there is at least a partial overlap between the sensor's current field of view and the user's current field of view.

16. The method of claim 12, wherein based on the real-world object not being identifiable in the real-world scene determined by virtue of a determination that at least a predetermined amount of the real-world scene has been covered in the sensor data within a recent predetermined time period and the real-world object has not been identified in said recent predetermined time period, providing at least one of:
- presentation of the spatial audio without a particular direction such that the spatial audio is perceived as ambient audio; or
- termination of the presentation of the spatial audio.

17. The method of claim 16, wherein based on the real-world object having returned to the real-world scene determined at least by virtue of the automatic identification of the particular real-world object in the sensor data of the real-world scene, providing for presentation of the spatial audio with a particular direction corresponding to a direction towards the returned real-world object from a point of view of the user.

18. The method of claim 12, wherein the modification of the particular direction of the spatial audio from the previously-determined-direction to the direction outside the current field of view of the user comprises modification of the particular direction to a direction within a threshold angle of an edge of the field of view of the user, such that the spatial audio is perceived by the user as originating from a direction just out of view of the user.

19. The method of claim 12, wherein the method further comprises one of:
- an augmented reality device having speakers for presentation of the spatial audio, the augmented reality device configured to allow the user a view of the real-world scene before them;
- a virtual reality device configured to provide a virtual reality view, captured by a camera, of the real-world scene to the user, the virtual reality view defining the current field of view of the user and the virtual reality device having speakers for presentation of the spatial audio; or
- an apparatus in communication with said augmented reality device or said virtual reality device.

20. A non-transitory computer readable medium comprising program instructions stored thereon for and when executed by at least a processor performing at least the following:
- receiving spatial audio configured to be associated with a moveable, particular real-world object in a real-world scene, the spatial audio comprising audio that is for audible presentation such as to be perceived as originating from a particular direction in the real-world scene;
- determining a location of the particular real-world object based on identification of the particular real-world object in sensor data of the real-world scene enabling positioning of the particular direction of the spatial audio to correspond to the location of the particular real-world object in the scene, the sensor data obtained from at least one sensor having a sensor field of view that covers a limited region of the real-world scene at any one time;
- based on a current location of the particular real-world object being unknown by virtue of the particular real-world object not being identifiable in the sensor data, providing for audible presentation to a user of the spatial audio such that the spatial audio is perceived as originating from a particular direction comprising a previously-determined-direction comprising a direction towards a previously determined location at which the real-world object was identified in the real-world scene; and
- based on one or both of a current field of view of the user and a current field of view of the sensor moving to a position that includes said previously determined location, providing for modification of the particular direction of the spatial audio from the previously-determined-direction to a direction outside the current field of view of the user at least until the particular real-world object is identified in the sensor data.

* * * * *

UNITED STATES PATENT AND TRADEMARK OFFICE
CERTIFICATE OF CORRECTION

PATENT NO. : 10,887,719 B2
APPLICATION NO. : 16/605310
DATED : January 5, 2021
INVENTOR(S) : Eronen et al.

It is certified that error appears in the above-identified patent and that said Letters Patent is hereby corrected as shown below:

In the Claims

Column 20, Claim 1, Line 15:
"scenes; and" should read --scene; and--

Column 23, Claim 20, Line 20:
"ing program instructions stored thereon for and when" should read --ing program instructions stored thereon and when--

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*